United States Patent
Bose et al.

(10) Patent No.: US 10,037,214 B2
(45) Date of Patent: Jul. 31, 2018

(54) DETERMINING POWER CAPPING POLICIES FOR A COMPUTER DEVICE

(71) Applicant: Cisco Technology, Inc., San Jose, CA (US)

(72) Inventors: Sriranjan Bose, Bangalore (IN); Chitkala Sethuraman, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 111 days.

(21) Appl. No.: 14/801,351

(22) Filed: Jul. 16, 2015

(65) Prior Publication Data

US 2017/0017288 A1    Jan. 19, 2017

(51) Int. Cl.
*G06F 1/32*    (2006.01)
*G06F 9/4401*    (2018.01)

(52) U.S. Cl.
CPC .......... *G06F 9/4411* (2013.01); *G06F 1/3203* (2013.01); *G06F 1/3206* (2013.01); *G06F 1/3287* (2013.01); *G06F 9/4416* (2013.01); *Y02D 10/171* (2018.01)

(58) Field of Classification Search
CPC .... G06F 9/4411; G06F 9/4416; G06F 1/3287; G06F 1/3203; G06F 1/3206
See application file for complete search history.

(56) References Cited

U.S. PATENT DOCUMENTS

| | | | |
|---|---|---|---|
| 7,562,239 B2 | 7/2009 | Fung | |
| 8,266,458 B2 | 9/2012 | Inoue | |
| 8,566,834 B2 | 10/2013 | Corn et al. | |
| 2006/0082222 A1* | 4/2006 | Pincu | H02J 1/102 307/29 |
| 2007/0050646 A1* | 3/2007 | Conroy | G06F 1/26 713/300 |
| 2007/0245161 A1* | 10/2007 | Shaw | G06F 1/3203 713/300 |
| 2009/0125737 A1* | 5/2009 | Brey | G06F 1/3203 713/322 |
| 2010/0205469 A1* | 8/2010 | McCarthy | G06F 9/5061 713/324 |
| 2012/0198255 A1* | 8/2012 | Chase | G06F 1/3203 713/322 |
| 2014/0359315 A1* | 12/2014 | Matsui | G06Q 50/06 713/300 |
| 2016/0189793 A1* | 6/2016 | Godavarthi | G11C 17/18 365/96 |

OTHER PUBLICATIONS

Bose, Sriranjan et al, Cisco UCS C-Series M4 Server Power Management, White Paper, pp. 1-15, Aug. 25, 2014, Cisco Systems, Inc., San Jose, United States.
Bianchini, Ricardo et al., Power and Energy Management for Server Systems, IEEE Computer Society Press, vol. 37, Issue 11, pp. 1-11, Nov. 2004, IEEE, Piscataway, United States.
Sawyer, Richard, Calculating Total Power Requirements for Data Centers, White Paper #3, 2004, pp. 1-12, American Power Conversion, West Kingston, United States.

* cited by examiner

Primary Examiner — Mohammad Ali
Assistant Examiner — Vincent Chang
(74) Attorney, Agent, or Firm — Patterson + Sheridan, LLP (57) ABSTRACT

Aspects of the present disclosure provide techniques for accurately determining maximum and minimum power capping values that may be used to increase power use efficiency (PUE) and reliability of a computing environment (e.g., a data center comprising one or more servers).

17 Claims, 6 Drawing Sheets

DATA STORE
PERIPHERAL DEVICES ⸺116

Entry 1
<adaptorFruCapProvider
model="UCSC-PCIE-E14102"
vendor="Emulex Corp."
>
< equipmentManufacturingDef
name="Emulex OCe14102-UX 10GbE CNA"
caption="Emulex OCe14102-UX 10GbE CNA"
description="Emulex OneConnect OCe14102-UX Dual Port 10-GbE FCoE CNA(SFP+ copper)"
pid="UCSC-PCIE=E14102"
powMin="10"
powMax="15"
/>

Entry 2
<equipmentLocalDiskCapProvider
vendor="SEAGATE"
model="ST9300653SS"
>
< equipmentManufacturingDef
name="300GB SAS 15K RPM SFF HDD/hot plug/sled mounted"
caption="300GB SAS 15k RPM SFF HDD/hot plug/sled mounted"
description="300GB SAS 15k RPM SFF HDD/hot plug/sled mounted"
pid="UCS-HDD300G12F105"
powMin="5"
powMax="10"
/>

Profile Properties

Name: standard

Enable profile: ☑    Correction Time: 3    (3 - 600) Seconds

Power Limit: 350    (320 - 742) W    Action: Alert

Allow Throttle: ☑    Set Hard Cap: ☐

— 602

Suspend Period:

Start Time: hh: 09  mm: 00

End Time: hh: 21  mm: 00

— 604

| Day: | All Days ☐ | Sunday ☐ | Monday ☑ | Tuesday ☑ |
|---|---|---|---|---|
| | Wednesday ☑ | Thursday ☑ | Friday ☑ | Saturday ☐ |

Clear

DETERMINING POWER CAPPING POLICIES FOR A COMPUTER DEVICE

TECHNICAL FIELD

Embodiments presented herein generally relate to power management for servers, and more specifically, to accurate measurement of server power characterization for effective power capping policies.

BACKGROUND

Traditionally, a data center or chassis unit does not enforce a limit on the amount of power that servers within the data center can consume. As a result, servers are often allocated with more power than they actually use. In order to avoid unnecessary power allocation to the servers, power capping may be used to reduce the amount of electricity or power that servers can consume at a given time by enforcing power consumption limits. Ultimately, this can reduce the electricity costs of running the servers. When power capping is used, however, servers might not have enough power to run at their peak performance level, and as a result, power capping may cause performance degradation.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Embodiments of the present disclosure provide an apparatus for performing power management, the apparatus includes at least one processor configured to perform a stress test on a first component of a computing device, determine a combined maximum power consumption value and a combined minimum power consumption value for the first component based on the stress test, identify a combined platform-specific power consumption value of the computing device, wherein the combined platform-specific power consumption value comprises a power consumption value from a second component that uses a constant power while the computing device is operating, determine one or more peripheral-specific power consumption values for one or more peripheral devices coupled to the computing device, wherein determining the one or more peripheral-specific power consumption values comprises accessing a data store of peripheral-specific power consumption values, and determine a maximum power capping value and a minimum power capping value for the computing device based on the determined combined maximum power consumption value, the combined minimum power consumption value, the platform-specific power consumption value, and the one or more peripheral-specific power consumption values, and at least one memory coupled with the at least one processor.

Embodiments of the present disclosure provide a method for power management, the method comprising performing a stress test on a first component of a computing device, determining a combined maximum power consumption value and a combined minimum power consumption value for the first component based on the stress test, identifying a combined platform-specific power consumption value of the computing device, wherein the combined platform-specific power consumption value comprises a power consumption value from a second component that uses a constant power while the computing device is operating, determining one or more peripheral-specific power consumption values for one or more peripheral devices coupled to the computing device, wherein determining the one or more peripheral-specific power consumption values comprises accessing a data store of peripheral-specific power consumption values, and determining a maximum power capping value and a minimum power capping value for the computing device based on the determined combined maximum power consumption value, the combined minimum power consumption value, the platform-specific power consumption value, and the one or more peripheral-specific power consumption values.

Embodiments of the present disclosure provide a non-transitory computer readable medium for performing power management, comprising code for performing a stress test on a first component of a computing device, determining a combined maximum power consumption value and a combined minimum power consumption value for first component based on the stress test, identifying a combined platform-specific power consumption value of the computing device, wherein the combined platform-specific power consumption value comprises a power consumption value from a second component that uses a constant power while the computing device is operating, determining one or more peripheral-specific power consumption values for one or more peripheral devices coupled to the computing device, wherein determining the one or more peripheral-specific power consumption values comprises accessing a data store of peripheral-specific power consumption values, and determining a maximum power capping value and a minimum power capping value for the computing device based on the determined combined maximum power consumption value, the combined minimum power consumption value, the platform-specific power consumption value, and the one or more peripheral-specific power consumption values.

Example Embodiments

Aspects of the present disclosure provide techniques for accurately determining maximum and minimum power capping values that may be used to increase power use efficiency (PUE) and reliability of a computing environment (e.g., a data center comprising one or more servers).

Power capping is the capability to limit the power consumption of a system, be it a blade server or a rackmount server, to some threshold that is less than or equal to the system's maximum rated power. The feature typically provides incremental benefits with scaling, a greater number of systems under power capping, and provides even better utilization of power consumption.

There are two major types of power capping: static power capping and dynamic power capping. Static power capping involves distributing a fixed budget of power across multiple servers by calculating the individual system consumption using its rated or name-plate power rating.

For example, if the maximum power consumption of a server is designated as 340 watts (W) and a rack in a data center is equipped with 10 such servers and has only 3100 W AC of power available to the rack (i.e., the rack's power supply is capable of supplying 3100 W AC to the servers), each server in the rack can be capped at a maximum of 300 W to avoid exceeding the capacity of the power supply. An obvious drawback of this approach is the inconsistency of power consumption across rack servers. For example, the power consumption may change with configuration of the same server, depending on the type of dual in-line memory modules (DIMMs), central processing units (CPUs) and adapters the system is equipped with. Another drawback is that the power consumption of all the systems in the same rack may not be peaking at the same time. So, the server power consumption is capped, even when the overall budget has the headroom to allocate more power to the system.

Dynamic power capping, allows a power management system to allocate the total pool of power across groups of multiple systems. For example, this type of power capping is extremely effective in blade servers, where multiple blades reside within a single chassis and share the power supply. With dynamic power capping, the system as a whole can conform to a specific power budget, but power can be steered to the specific nodes that have higher loads and require additional power. However, the dynamic load stress tool/mechanism for measuring maximum power consumption for dynamic power capping is limited by the ability of the tool. For example, typical tools stress only the CPU and memory, leaving behind gaps in the estimation of other sub-systems, which may not been stressed by the tool. As such, there might be scenarios, where the system might draw more power than estimated by the tool.

For efficient power limit solutions, it is important to neither overestimate, nor under estimate the max power consumption of a system. For example, overestimating the maximum power consumption of a system drives down power utilization efficiency (PUE) of the system by allocating power to the system that will never be used by the system. Underestimating the maximum power consumption of a system may lead to a circuit breaker trip if the system starts consuming more power than budgeted, eventually causing a system failure.

Thus, aspects of the present disclosure provide techniques for accurately determining maximum and minimum power capping values that may be used to increase PUE and reliability of the data center.

Figure 1:
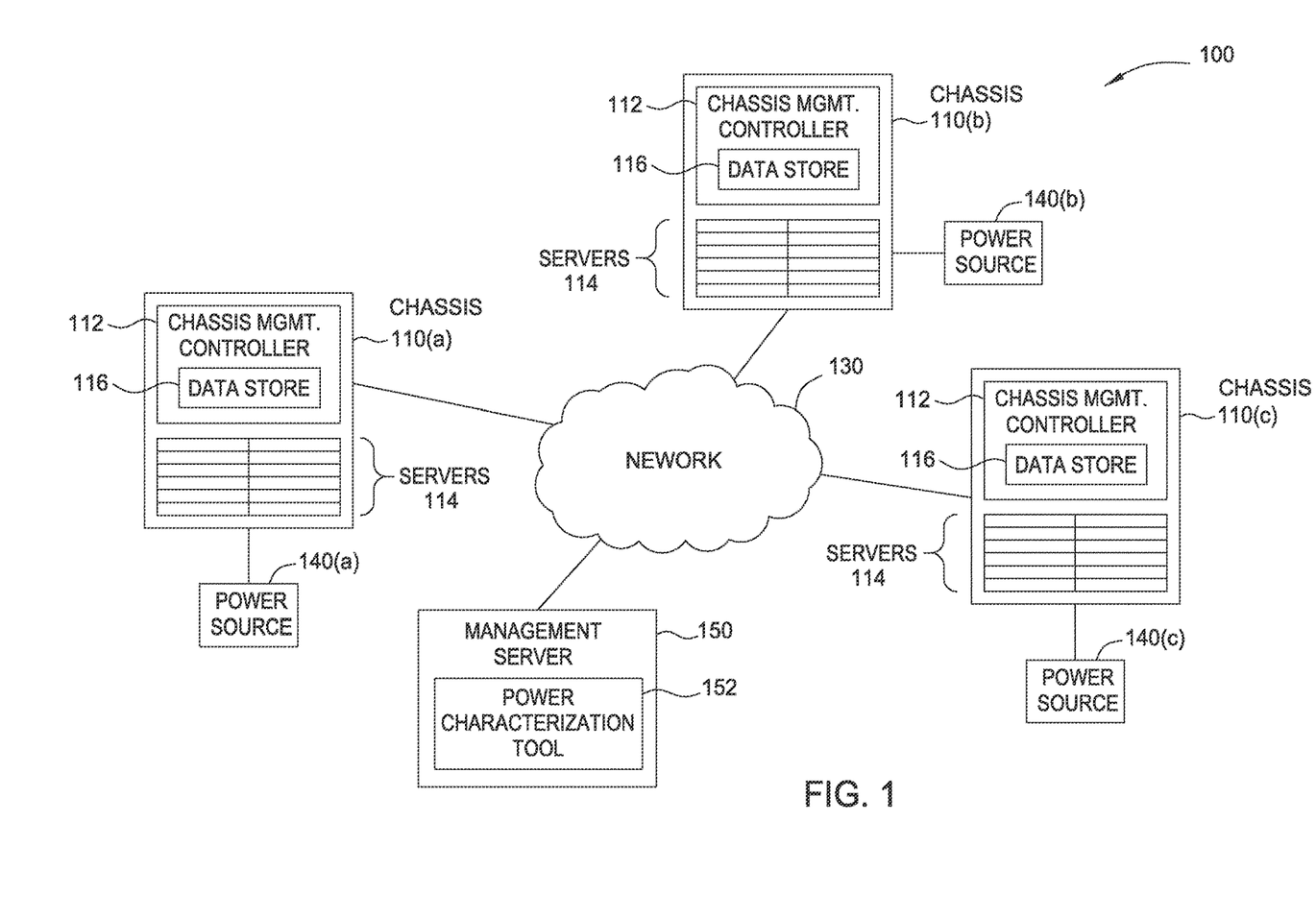
FIG. 1 illustrates a general block diagram of computing system with an SRAM in accordance with certain aspects of the present disclosure.

FIG. 1 illustrates a computing environment 100 (e.g., a data center) for accurately determining maximum and minimum power capping values. The computing environment 100 comprises a management server 150 and a plurality of chassis units 110(a)-110(c). Each of the plurality of chassis units houses a plurality of servers (e.g., rack-mount servers, blade servers, micro-servers, etc.), shown at reference numerals 114, and a chassis management controller device 112. The chassis management controller device 112 may, for example, perform server power redistribution to distribute power to the plurality of servers in each respective chassis unit, as described hereinafter. The management server 150 communicates with the plurality of chassis units 110(a)-110(c) via network 130. For example, the management server 150 may determine minimum and maximum power capping values using a power characterization tool 152 and send these values as policy information to the chassis units 120(a)-120(d). The chassis management controllers 112 may use this policy information to control the power of the servers 114 in each of the chassis 110(a)-110(c).

According to certain aspects, the maximum capping value indicates the maximum possible power that can be consumed by the given server configuration, under any kind of load. Depending on the peripherals and types of components present on the system, the maximum possible power that can be consumed may vary from the rating of the power supply unit (i.e., the maximum amount of power that the power supply can supply to the system) connected to the system, to a smaller sub value. For example, a unit with 1200 W power supplies may consume only 500 W under maximum possible load if it is equipped with lower power CPUs and fewer DIMMs and drives. On the other hand, a system having 145 W (or higher power) CPU's along with graphics processing unit (GPU) cards, may consume the full 1200 W of the rated power supply output. This maximum power rating is important for the efficient provisioning of the power across servers, so that stranded power capacity is not allocated to servers which are not capable of reaching the maximum rating of the power supply.

According to certain aspects, the minimum power capping value indicates the minimum power that a data center can consume without impacting the data center performance drastically. Theoretically, the minimum power consumption of a system can be extremely low, but for a usable platform, the value may be a number which allows the server to continue functioning, albeit with reduced performance.

According to certain aspects, an administrator of the system can set the data center power cap at minimum power consumption value under special conditions, for example, when there is an outage in the primary electrical supply of the data center and the data center is running on emergency backup power. Since critical IT infrastructure is still required to be running until the outage is resolved, servers in the data center can be programmed to run at the minimum power capping values.

As noted above, the maximum and minimum power capping values may be determined by a power characterization tool 152 on the management server 150.

Figure 2:
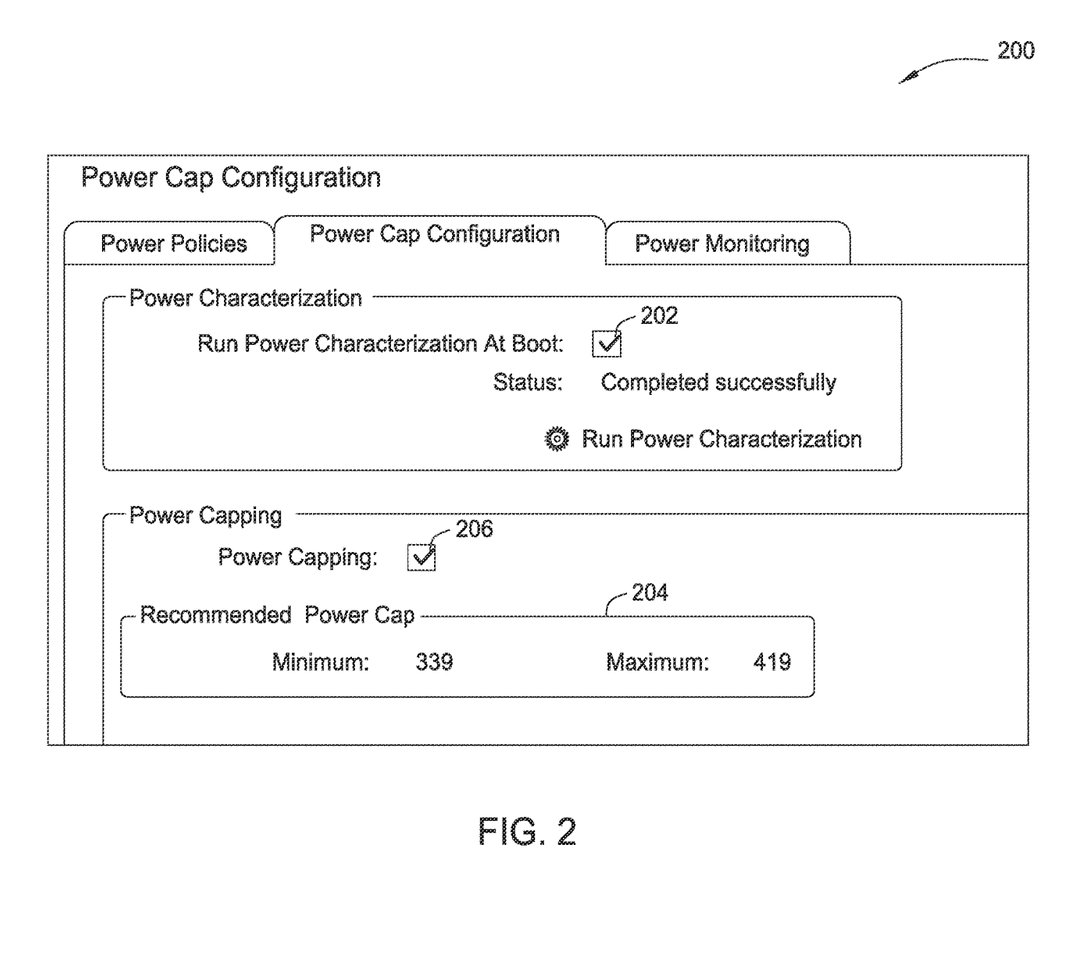
FIG. 2 illustrates an example user interface of a power characterization tool, according to certain aspects of the present disclosure.

FIG. 2 illustrates an example user interface of the power characterization tool 152 that may be used to determine maximum and minimum power capping values for one or more servers 114 of a data center (e.g., computing environment 100). As illustrated, the power characterization tool 152 may comprise a user-selectable option 202 to run the power characterization tool during a boot operation of the one or more servers. As described in further detail below, when this option is selected, the power characterization tool 152 will run various tests (e.g., one or more stress tests) during a boot operation of the one or more servers 114 to determine maximum and minimum power consumption values of various components (e.g., CPUs, memories, fans, etc.) of the one or more servers 114 which consume varying amount of power based on an operational condition of the one or more servers 114. The power characterization tool 152 may also determine power consumption values for devices that consume a constant power while operating and for peripheral devices coupled to the one or more servers.

Figure 3:
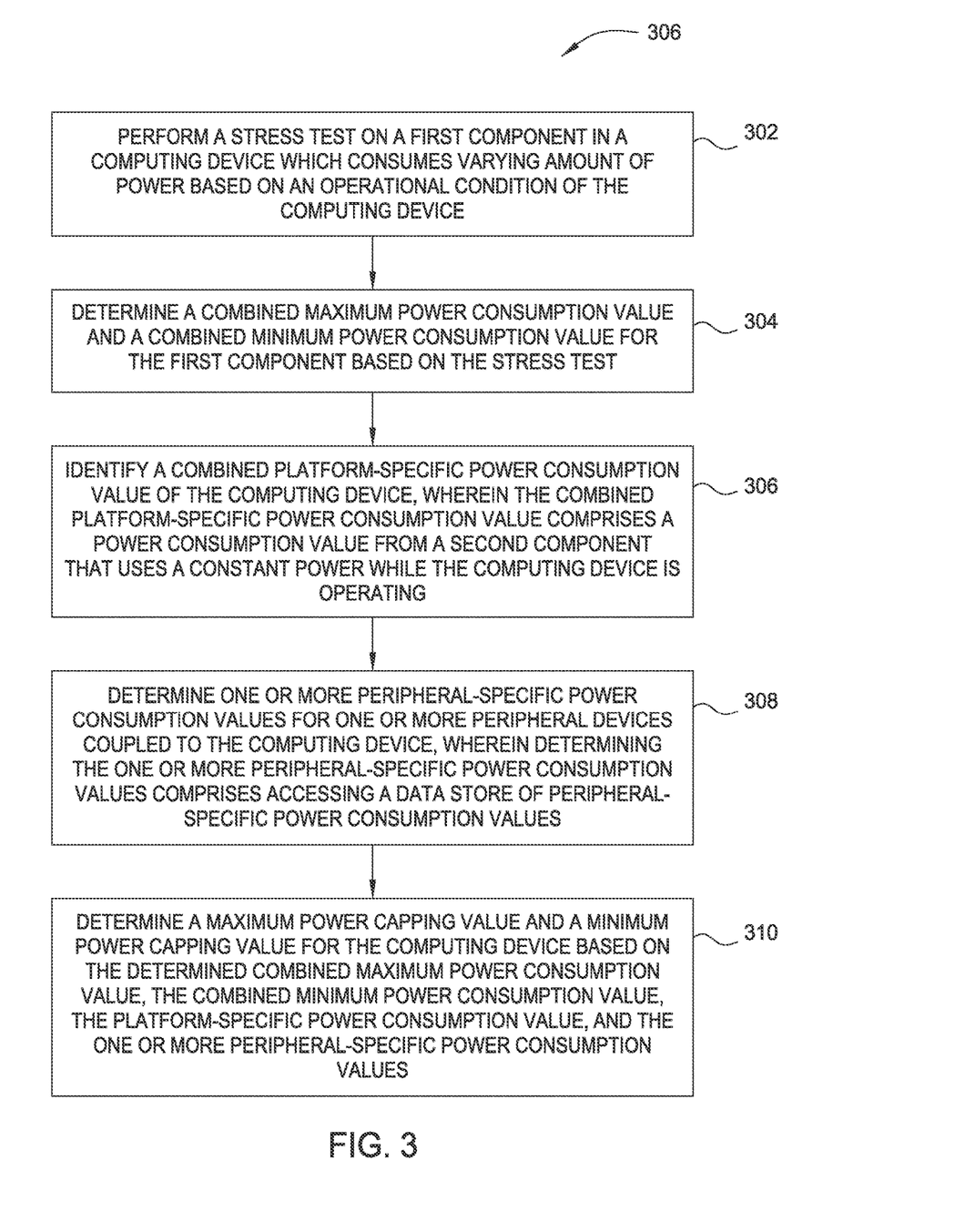
FIG. 3 illustrates an example data store of entries for peripheral devices coupled to one or more servers.

According to certain aspects, from the various power consumption values, the power characterization tool 152 may determine a maximum and minimum power capping values for one or more of the servers 114 according to the following equations:

$$P_{max} = P_{constant} + P_{stress\text{-}max} + P_{misc\text{-}max} \quad (1)$$

$$P_{min} = P_{constant} + P_{stress\text{-}min} + P_{misc\text{-}min} \quad (2)$$

where $P_{max}$ is the maximum power capping value, $P_{min}$ is the minimum power capping value, $P_{constant}$ is a combined power consumption value for components of the one or more servers 114 that consume a constant power while operating, $P_{stress\text{-}max}$ and $P_{stress\text{-}min}$ are the combined maximum power consumption value and the combined minimum power consumption value, respectively, for the one or more components that are stressed during a stress test, and $P_{misc\text{-}max}$ and $P_{misc\text{-}min}$ are the combined maximum power consumption value and combined minimum power consumption value, respectively, for peripheral devices coupled with the one or more servers 114. These values and how they are determined will be described in greater detail below with reference to FIG. 3.

According to certain aspects, once the maximum and minimum power capping values have been determined, the power characterization tool 152 may display them to the user as recommendations at 204, as illustrated in FIG. 2. Additionally, as illustrated in FIG. 2, the power characterization tool 152 may comprise a user-selectable option 206 for enabling/disabling power capping of one or more servers in a data center managed by the power characterization tool 152. When power capping is enabled, the power that the one or more servers may consume may be limited.

FIG. 3 illustrates example operations 300 for determining maximum and minimum recommended power capping values. According to certain aspects of the present disclosure, the operations 300 may be performed, for example, by the power characterization tool 152.

Operations 300 begin at 302 with the power characterization tool 152 performing a stress test on one or more components of a server (e.g., one or more of the servers 114) which consume varying amount of power based on an operational condition of the one or more servers 114. For example, at 302, the power characterization tool 152 may use an extensible firmware interface (EFI) option read only memory (ROM) based stress utility during a boot operation (e.g., during a BIOS power-on self test (POST) stage) of one or more of the servers 114 to stress system components which consume varying amount of power based on an operational condition of the one or more servers 114. For example, these components may comprise one or more central processing units (CPUs) whose power consumption may depend on the amount of processing to be performed, one or more memories whose power consumption may depend on a number of read/write operations to be performed, and one or more fans whose power consumption may depend on a temperature of the one or more servers 114. Thus, the processing being performed by the CPU, the number of read/writes to memory, and the temperature are non-limiting examples of operation conditions that affect the amount of power drawn by the components.

At 304, based on the one or more stress tests, the power characterization tool 304 determines a combined maximum and a combined minimum power consumption value of the one or more CPUs, memories, and/or fans. As noted above, these maximum and minimum power consumption values are referred to above in Equations 1 and 2 as "Pstress-max" and "Pstress-min".

At 306, the power characterization tool 152 may also identify platform-specific power consumption values for components of the one or more servers 114 that use a constant power while the component is operating (e.g., a motherboard). As noted above in Equations 1 and 2, this power consumption value is referred to herein as "Pconstant".

At 308, the power characterization tool 152 may also determine combined power consumption values for miscellaneous peripheral devices coupled to one or more of the servers 114, for example, by using a data store of peripheral-specific power consumption values, as described below. In one embodiment, the chassis management controller device 112 includes a data store 116 (e.g., an XML catalogue) of entries for various peripheral devices connected to one or more servers. Each entry in the data store (and each peripheral device) may be associated with a peripheral identifier (PID) and include power consumption information for the peripheral device associated with the PID.

Figure 4:
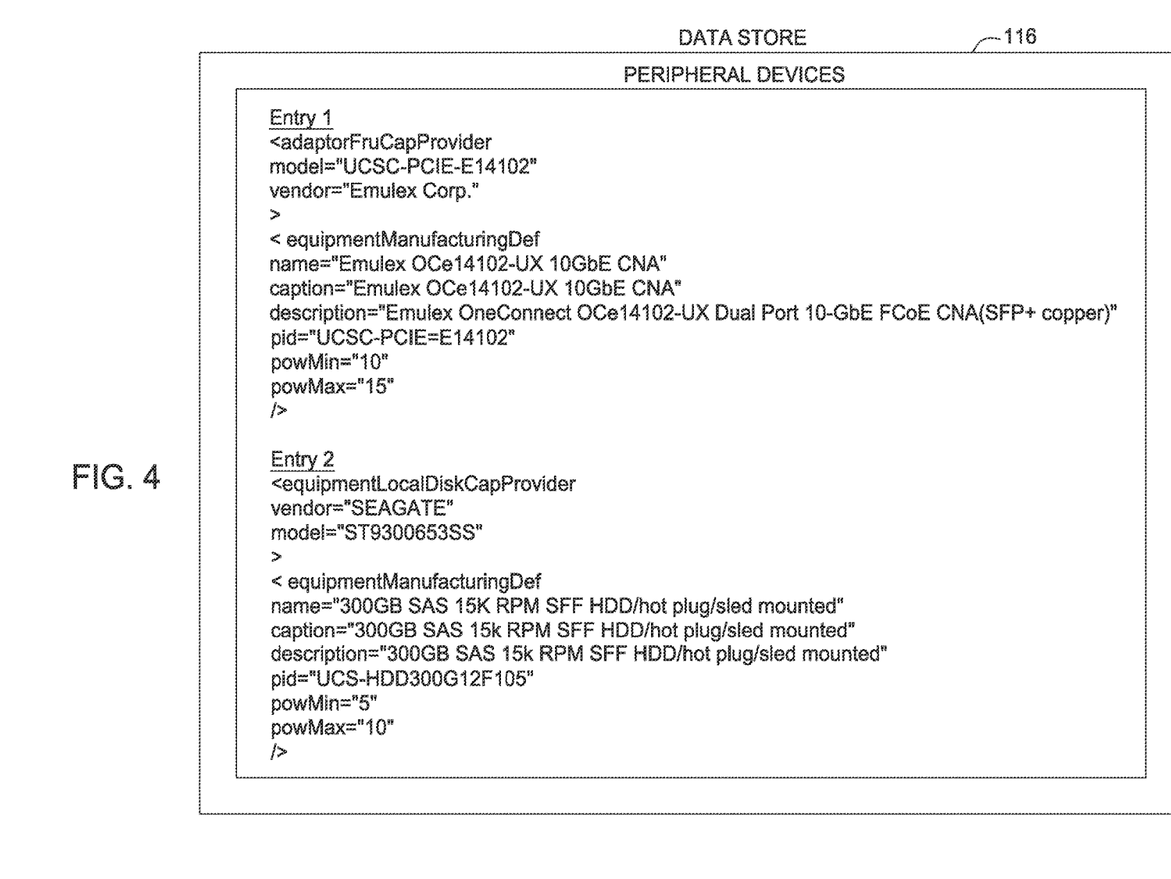
FIG. 4 illustrates example operations for determining maximum and minimum power capping values, according to certain aspects of the present disclosure.

FIG. 4 illustrates an example data store of entries for peripheral devices coupled to one or more servers (e.g., one or more of the servers 114). As illustrated, one entry (e.g., Entry 2) in the data store may correspond to a hard disk drive, which has an associated PID. The entry for the hard disk drive may also list maximum and minimum (e.g., "powMax" and "powMin") power consumption values for the hard disk drive supplied by the manufacturer, which may be used when determining maximum and minimum power capping values, as described below.

For example, according to certain aspects, at 308, the power characterization tool 152 may determine a list of peripheral devices coupled to one or more of the servers 114 and may access the data store 116 to determine the maximum and minimum power consumption values for each peripheral device listed. The power characterization tool 152 may add all of the maximum power consumption values for each peripheral device coupled to the one or more servers 114 to determine a combined maximum power consumption value (e.g., "Pmisc-max" in Equation 1) for peripheral devices coupled to the one or more servers 114. The power characterization tool 152 may also add all of the minimum power consumption values for each peripheral device coupled to the one or more servers 114 to determine a combined minimum power consumption value (e.g., "Pmisc-min" in Equation 2) for peripheral devices coupled to the one or more servers 114.

Figure 5:
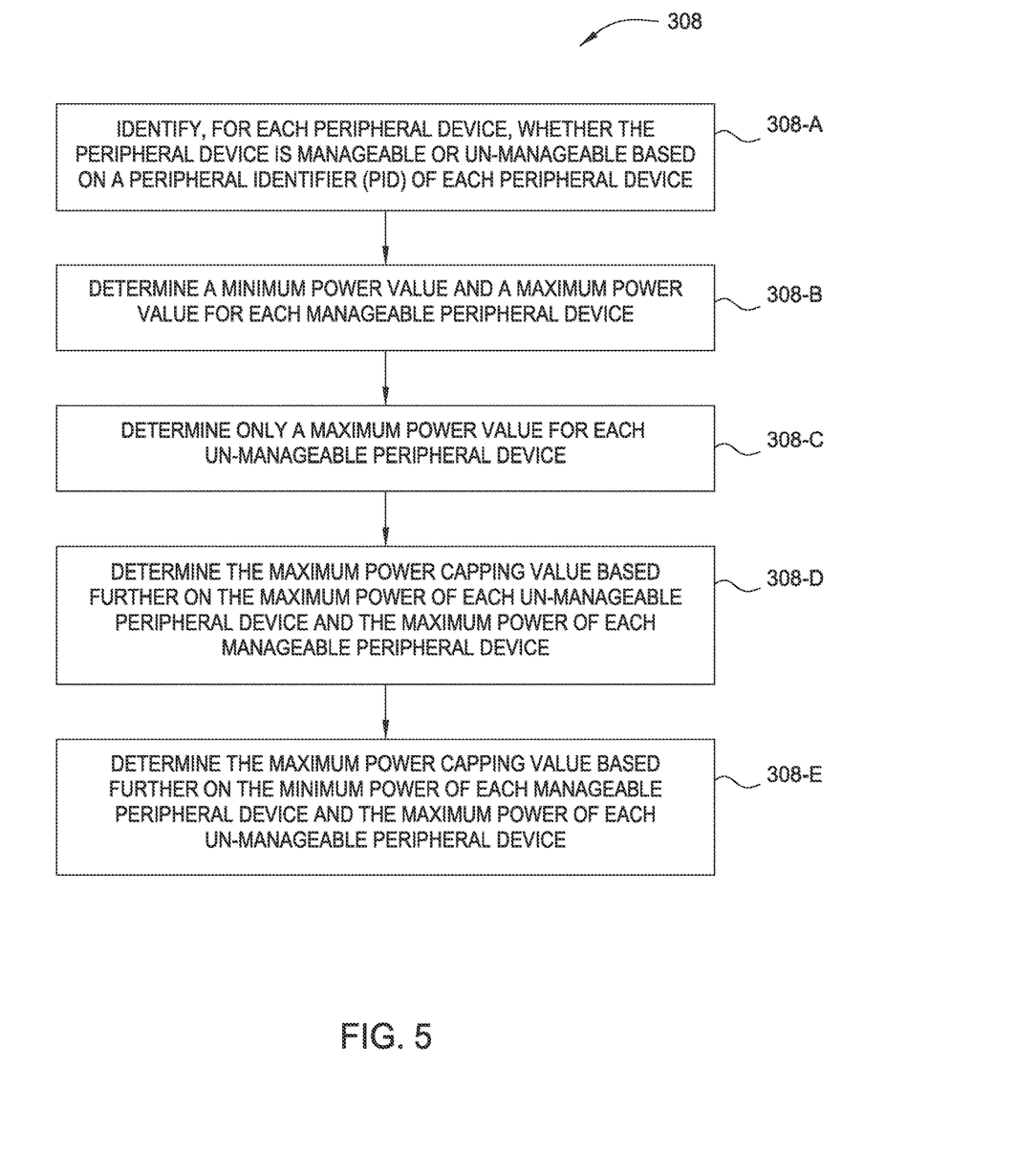
FIG. 5 illustrates example operations for determining whether a peripheral device is power manageable or power un-manageable, according to certain aspects of the present disclosure.

It should be noted, however, that certain peripheral devices may not be able to be power capped (i.e., power for these types of peripheral devices may not be managed), and, thus, this needs to be taken into account by the power characterization tool 152 when determining the combined maximum and minimum power consumption values for the peripheral devices. FIG. 5 illustrates detailed example operations, corresponding to 308 in FIG. 3, for determining the combined maximum and minimum power consumption values for the peripheral devices For example, when determining the combined maximum and minimum power consumption values for the peripheral devices, at 308-A, the power characterization tool 152 may identify based, at least in part, on a PID whether each peripheral device coupled to a server is power manageable or power un-manageable. According to certain aspects, a peripheral device is manageable if an operating power of the peripheral device can be controlled by at least one component external (e.g., the Chassis Management Controller 112) to the peripheral device and the peripheral device is un-manageable if the operating power of the peripheral device cannot be controlled by at least one component external to the peripheral device. For example, in an un-manageable peripheral device, the other components in the server (e.g., processor, motherboard, etc.) cannot instruct the peripheral device to reduce its power consumption. In contrast, with manageable peripheral devices, the CPU may be able to dictate that amount of power the peripheral device consumes.

At 308-B, the power characterization tool 152 determines a minimum power value and a maximum power value for each power manageable peripheral device. At 308C, for peripheral devices that are power un-manageable, the power characterization tool 152 determines only a maximum power value.

At 308-D, the power characterization tool 152 determines the combined maximum power consumption value (i.e., Pmisc-max) for the peripheral devices coupled to the one or more servers 114 by using the maximum power consumption values for the power manageable and power un-manageable peripheral devices. At 308-E, the power characterization tool 152 determines the combined minimum power consumption value (i.e., Pmisc-min) for the peripheral devices coupled to the one or more servers 114 by using the minimum power consumption values for peripheral devices that are power manageable and the maximum power consumption values for the devices that are power un-manageable.

According to certain aspects, once all of the power consumption values described above have been determined, at 310, the power characterization tool 152 determines the maximum and minimum power capping values according to the following equations (1) and (2) noted above.

In other words, the power characterization tool 152 may determine the maximum and minimum power capping values by summing up the platform-specific power consumption values for the devices that use a constant power while operating (e.g., a motherboard), the maximum and minimum power consumption values of the devices that were stressed during the stress test (e.g., CPUs, memories, and fans), and the maximum and minimum power consumption values for the power manageable and power un-manageable peripheral devices. The power characterization tool 152 may then display the determined maximum and minimum power capping values at 204 of the user interface 200.

It should be noted that the determined maximum and minimum power capping values may only remain valid as long as the system configuration remains the same. Thus, according to certain aspects, when the system configuration changes (e.g., one or more peripheral devices are added or removed from one or more of the servers 114), the operations 300 may be re-run to determine maximum and minimum power consumption values for the new system configuration.

According to certain aspects, once the maximum and minimum power capping values have been determined for the one or more servers 114, these power capping values may be used to choose a single or combination of policies for power capping server power consumption such that a power budget is never at risk of overshooting.

For example, assume that the power characterization tool 152 determines a minimum power capping value of 350 watts (W) and a maximum power capping value of 725 W. Assume further that during a period of time between 21:00 and 9:00 power usage of the servers 114 is low, never going above 350 W, and that power usage of the servers 114 between 9:00 and 21:00 is high and does go over 350 W.

Figure 6:
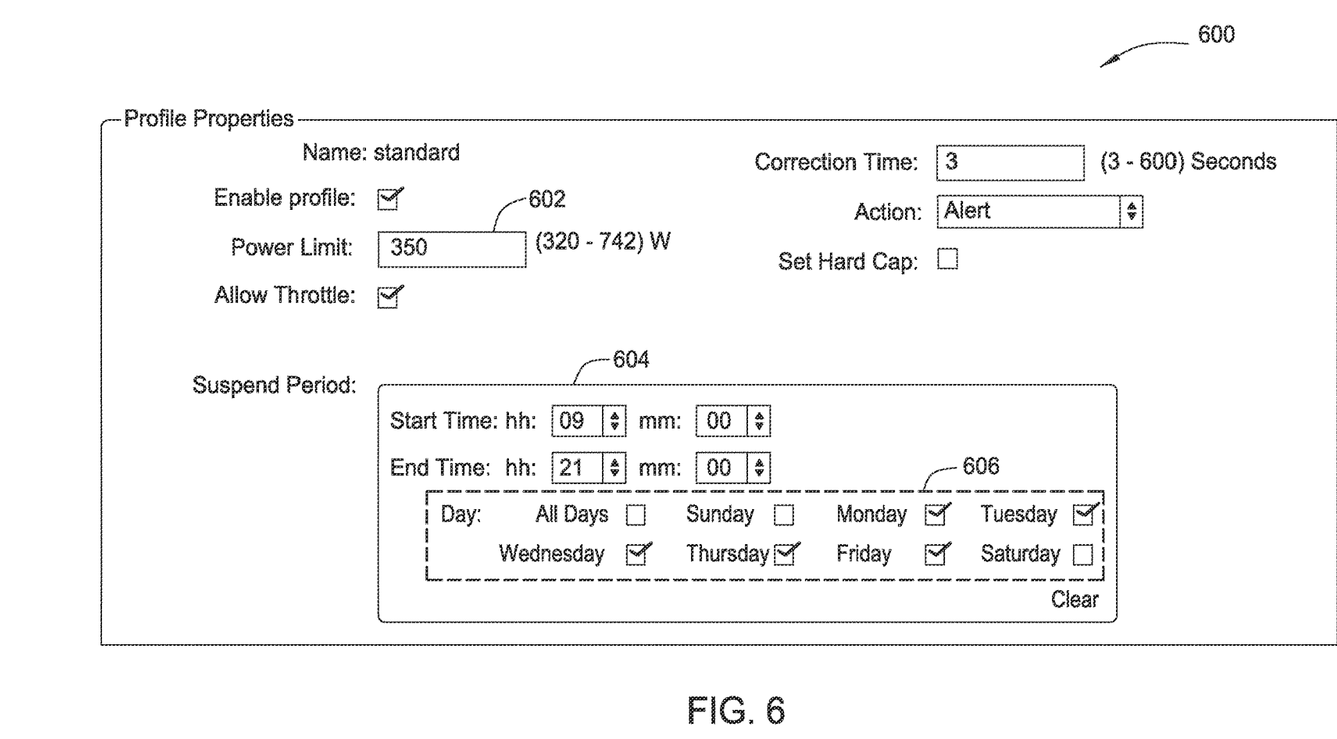
FIG. 6 illustrates an example user interface of a power characterization tool for setting power capping profiles, according to certain aspects of the present disclosure.

As shown in FIG. 6, a system administrator may create a power capping profile using a user interface 600 that caps the power of the servers 114 to 350 W between the time of 21:00 and 9:00 when power usage of the servers 114 is low but suspends the power capping of the servers 114 during the time period between 9:00 and 21:00 when power usage of the servers 114 is high. For example, the system administrator may enter 350 W into a power limit field at 602 and a period of time (e.g., 9:00 to 21:00) at 604 to suspend the 350 W power cap.

Additionally, the system administrator may further refine the power capping profile by selecting one or more options 606 such as days of the week the power capping will be suspended. For example, if it is known that servers 114 only experience high power usage during Monday through Friday of any particular week but experience low power usage on Saturday and Sunday, the system administrator may set the power capping profile such that the power capping is only suspended during Monday-Friday but remains in effect on Saturday and Sunday. These power capping policies ensure that power is used more efficiently while still maintaining reliability of the system.

According to certain aspects, while the operations 300 are designed to provide an accurate recommendation of maximum and minimum power capping values for one or more servers of a data center, the accuracy of these power capping values may be increased by taking into account other factors. For example, based on a usage history of the one or more servers 114, an administrator may determine that, even during high usage, the one or more servers 114 may still not consume enough power to reach the maximum power capping value. In such a scenario, the system administrator may take this into account and may decrease the maximum power capping power accordingly, allowing extra power to be allocated elsewhere.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Aspects of the present disclosure may be a system, a method, and/or a computer program product. The computer program product may include a computer readable storage medium (or media) having computer readable program instructions thereon for causing a processor to carry out aspects described herein.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-oriented systems that perform the specified functions or acts, or combinations of special purpose hardware and computer instructions.

In view of the foregoing, the scope of the present disclosure is determined by the claims that follow.

We claim:

1. A method for power management, comprising:
    performing a stress test on a first component in a computing device which consumes varying amount of power based on an operational condition of the computing device;
    determining a combined maximum power consumption value and a combined minimum power consumption value for the first component based on the stress test;
    identifying a combined platform-specific power consumption value of the computing device, wherein the combined platform-specific power consumption value comprises a power consumption value from a second component that uses a constant power while the computing device is operating;
    determining one or more peripheral-specific power consumption values for one or more peripheral devices coupled to the computing device, wherein determining the one or more peripheral-specific power consumption values comprises:
        accessing a data store of peripheral-specific power consumption values,
        identifying, for each peripheral device, whether the peripheral device is manageable or un-manageable based on a peripheral identifier (PID) of each peripheral device, wherein a peripheral device is manageable if an operating power of the peripheral device can be controlled by at least one controller component external to the peripheral device and the peripheral device is un-manageable if the operating power of the peripheral device cannot be controlled by at least one controller component external to the peripheral device, wherein the controller is located on a chassis housing at least one server,
        determining a minimum power value and a maximum power value for each manageable peripheral device, and
        determining only a maximum power value for each un-manageable peripheral device; and
    determining a maximum power capping value and a minimum power capping value for the computing device based on the determined combined maximum power consumption value, the combined minimum power consumption value, the platform-specific power consumption value, and the one or more peripheral-specific power consumption values.

2. The method of claim 1, wherein the first component in the computing device which consumes varying amount of power based on the operational condition of the computing device comprises at least one of one or more central processing units (CPUs), one or more memories, and one or more fans.

3. The method of claim 1, wherein determining the maximum power capping value is further based on the maximum power of each un-manageable peripheral device and the maximum power of each manageable peripheral device.

4. The method of claim 1, wherein determining the minimum power capping value is further based on the minimum power of each manageable peripheral device and the maximum power of each un-manageable peripheral device.

5. The method of claim 1, wherein identifying, for each peripheral device, whether the peripheral device is manageable or un-manageable based on a peripheral identifier (PID) of each peripheral device, comprises:
    searching the data store for information indicating whether the device is manageable or un-manageable based on the PID of the device.

6. The method of claim 1, wherein performing the stress test comprises executing the stress test using firmware during a boot operation of the computing device.

7. The method of claim 1, wherein the second component that uses a constant power comprises a motherboard.

8. The method of claim 1, wherein the computing device comprises a rack-mounted server, a blade server, or a micro-server.

9. The method of claim 1, wherein the maximum power capping value indicates a maximum possible power that the computing device can consume and the minimum power capping value indicates a minimum possible power that the computing device can consume without impacting system performance of the computing device above a threshold.

10. An apparatus for performing power management, comprising:
    at least one processor configured to:
        perform a stress test on a first component in a computing device which consumes varying amount of power based on an operational condition of the computing device;
        determine a combined maximum power consumption value and a combined minimum power consumption value for the first component based on the stress test;
        identify a combined platform-specific power consumption value of the computing device, wherein the combined platform-specific power consumption value comprises a power consumption value from a second component that uses a constant power while the computing device is operating;
        determine one or more peripheral-specific power consumption values for one or more peripheral devices coupled to the computing device, wherein determining the one or more peripheral-specific power consumption values comprises:
            accessing a data store of peripheral-specific power consumption values;
            identifying, for each peripheral device, whether the peripheral device is manageable or un-manageable based on a peripheral identifier (PID) of each peripheral device, wherein a peripheral device is manageable if an operating power of the peripheral device can be controlled by at least one controller component external to the peripheral device and the peripheral device is un-manageable if the operating power of the peripheral device cannot be controlled by at least one controller component external to the peripheral device, wherein the controller is located on a chassis housing at least one server,
            determining a minimum power value and a maximum power value for each manageable peripheral device, and
            determining only a maximum power value for each un-manageable peripheral device; and
        determine a maximum power capping value and a minimum power capping value for the computing device based on the determined combined maximum power consumption value, the combined minimum power consumption value, the platform-specific power consumption value, and the one or more peripheral-specific power consumption values; and
    at least one memory coupled with the at least one processor.

11. The apparatus of claim 10, wherein the first component in the computing device which consumes varying amount of power based on the operational condition of the computing device comprises at least one of one or more central processing units (CPUs), one or more memories, and one or more fans.

12. The apparatus of claim 10, wherein the at least one processor is further configured to determine the maximum power capping value based on the maximum power of each un-manageable peripheral device and the maximum power of each manageable peripheral device, and wherein the at least one processor is further configured to determine the minimum power capping value based on the minimum power of each manageable peripheral device and the maximum power of each un-manageable peripheral device.

13. The apparatus of claim 10, wherein the at least one processor is configured to identify, for each peripheral device, whether the peripheral device is manageable or un-manageable based on a peripheral identifier (PID) of each peripheral device by:
  searching the data store for information indicating whether the device is manageable or un-manageable based on the PID of the device.

14. The apparatus of claim 10, wherein the at least one processor is configured to perform the stress test by executing the stress test using firmware during a boot operation of the computing device.

15. A non-transitory computer readable medium for performing power management, comprising code for:
  performing a stress test on a first component in a computing device which consumes varying amount of power based on an operational condition of the computing device;
  determining a combined maximum power consumption value and a combined minimum power consumption value for the first component based on the stress test;
  identifying a combined platform-specific power consumption value of the computing device, wherein the combined platform-specific power consumption value comprises a power consumption value from a second component that uses a constant power while the computing device is operating;
  determining one or more peripheral-specific power consumption values for one or more peripheral devices coupled to the computing device, wherein determining the one or more peripheral-specific power consumption values comprises:
    accessing a data store of peripheral-specific power consumption values,
    identifying, for each peripheral device, whether the peripheral device is manageable or un-manageable based on a peripheral identifier (PID) of each peripheral device, wherein a peripheral device is manageable if an operating power of the peripheral device can be controlled by at least one controller component external to the peripheral device and the peripheral device is un-manageable if the operating power of the peripheral device cannot be controlled by at least one controller component external to the peripheral device, wherein the controller is located on a chassis housing the at least one controller,
    determining a minimum power value and a maximum power value for each manageable peripheral device, and
    determining only a maximum power value for each un-manageable peripheral device; and
  determining a maximum power capping value and a minimum power capping value for the computing device based on the determined combined maximum power consumption value, the combined minimum power consumption value, the platform-specific power consumption value, and the one or more peripheral-specific power consumption values.

16. The apparatus of claim 15, wherein the first component in the computing device which consumes varying amount of power based on the operational condition of the computing device comprises at least one of one or more central processing units (CPUs), one or more memories, and one or more fans.

17. The method of claim 15, wherein the code for determining the maximum power capping value comprises code for determining the maximum power capping value based on the maximum power of each un-manageable peripheral device and the maximum power of each manageable peripheral device, and wherein the code for determining the minimum power capping value comprises code for determining the minimum power capping value based on the minimum power of each manageable peripheral device and the maximum power of each un-manageable peripheral device.

* * * * *

UNITED STATES PATENT AND TRADEMARK OFFICE
CERTIFICATE OF CORRECTION

PATENT NO. : 10,037,214 B2
APPLICATION NO. : 14/801351
DATED : July 31, 2018
INVENTOR(S) : Sriranjan Bose et al.

It is certified that error appears in the above-identified patent and that said Letters Patent is hereby corrected as shown below:

In the Specification

In Column 7, Line 4, after "devices" insert -- . --.

In Column 7, Line 27, delete "308C," and insert -- 308-C, --, therefor.

In the Claims

In Column 14, Line 29, in Claim 16, delete "apparatus" and insert -- non-transitory computer readable medium --, therefor.

In Column 14, Line 36, in Claim 17, delete "method" and insert -- non-transitory computer readable medium --, therefor.

Signed and Sealed this
Eighteenth Day of December, 2018

Andrei Iancu
*Director of the United States Patent and Trademark Office*